U nited States Patent  [15] 3,674,724
Marzocchi  [45] July 4, 1972

[54] POLYESTER REINFORCED ELASTOMERS

[72] Inventor: Alfred Marzocchi, Cumberland, R.I.
[73] Assignee: Owens-Corning Fiberglas Corporation
[22] Filed: April 27, 1970
[21] Appl. No.: 32,431

[52] U.S. Cl. ..............................260/3, 152/151, 156/110 A, 161/208, 161/231, 260/75 R, 260/75 SB, 260/75 N, 260/824, 260/827, 260/873
[51] Int. Cl. ........................................................C08d 9/10
[58] Field of Search..........................260/3, 873, 75 SB, 75 N

[56] References Cited

UNITED STATES PATENTS

| | | | |
|---|---|---|---|
| 3,252,825 | 5/1966 | Marzocchi et al. | 260/75 SB |
| 3,410,831 | 11/1968 | Hedrick et al. | 260/75 SB |
| 3,168,544 | 2/1965 | Jex | 260/75 SB |
| 2,917,414 | 12/1959 | McLean | 260/75 N |
| 2,721,854 | 10/1955 | Kohl | 260/75 SB |
| 2,584,351 | 2/1952 | Hunter et al. | 260/75 SB |
| 3,525,703 | 8/1970 | Iwami et al. | 260/3 |

FOREIGN PATENTS OR APPLICATIONS

| | | | |
|---|---|---|---|
| 22,713 | 6/1967 | Japan | 260/75 SB |

*Primary Examiner*—John C. Bleutge
*Attorney*—Staelin & Overman and Herman I. Hersh

[57] ABSTRACT

A new and improved polyester prepared by the reaction of a polycarboxylic acid, its acid halides or anhydrides, a polyol, and an organo silane, an amino silane or an organic titanate, and elastomeric products reinforced by fibers formed of same.

9 Claims, No Drawings

POLYESTER REINFORCED ELASTOMERS

This invention relates to improved polyester, and more particularly to improved polyesters for use as reinforcements in elastomeric products.

As used herein, the term "elastomer" is intended to mean and include natural rubber in the cured or uncured stage, vulcanized or unvulcanized stage, and synthetic organic elastomeric materials such as, nitriles, acrylic and esters and terpolymers thereof with styrene and acrylonitriles; styrene and vinyl pyridine; and rubbers as represented by butadiene polymers and copolymers with monoolefins such as butadiene-styrene copolymer, butadiene-acrylonitrile copolymers, butadiene-styrenevinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha monoolefin having from three to 20 carbon atoms, such as propylene, and a polyene, such as dicyclopentadiene, 1-4 hexadiene and preferably an alkylene or alkylidene norbornene, such as 5-alkylidene-2-norbornene and the like in which the alkylidene group numbers from two to 12 carbon atoms, and polysulfone rubbers.

This invention is addressed to the fuller utilization of the desirable characteristics of polyester fibers, such as their excellent dimensional stability (i.e., low growth during service), and high resistance to thermal degradation when used in combinations with elastomeric materials as a reinforcement in belt manufacture, as a reinforcement in cords and fabrics to increase strength, life, wearability and service characteristics of rubber tires, and as a reinforcement and the like in other elastomeric coated fabrics and molded elastomeric products.

Polyester fibers have been used for some time as reinforcements and the like in elastomeric products such as tires. However, polyesters heretofore known have had the disadvantage that they suffer excessive losses of tensile strength under high load and high speed conditions where high temperatures are developed. In addition, there is a problem in establishing a strong bonded relationship between the polyester fibers and the elastomeric material whereby the polyester fibers have a tendency to tear away from the elastomeric material.

It is accordingly an object of the present invention to provide new and improved polyester fibers which overcome the foregoing disadvantages.

It is a more specific object of the present invention to provide a new and improved polyester fiber which maintains high tensile strength under high load and high speed conditions.

It is another object of the invention to provide a new and improved polyester fiber, and method for its preparation, which provides a strong bonding relation with elastomeric materials when combined with such elastomeric materials in the manufacture of reinforced elastomeric products.

These and other objects and advantages of the invention will appear hereinafter, and it will be understood that the specific examples appearing herein are provided by way of illustration and not by way of limitation.

In accordance with the concepts of the present invention, a new and improved polyester fiber is prepared by adding to the polyester at a time prior to the melt spinning of the polyester fiber an organo silane whereby the silane becomes part of the polyester molecule. It has been found that polyester fibers prepared in accordance with the concepts of the present invention have increased tensile strength at high temperatures, and provide a stronger bonded relationship with elastomeric materials when combined with elastomeric materials in the manufacture of reinforced elastomeric products. In accordance with a preferred embodiment of the invention, the organo silane is added to the acid monomer prior to the polymerization reaction.

The novel polyesters of the present invention are prepared from conventional polycarboxylic acids and polyols in the presence of an esterification catalyst. The acid monomer is generally an aliphatic or aromatic polycarboxylic acid having two to 25 carbon atoms and two to four carboxyl groups per molecule.

Particularly preferred acids are those having the formula:

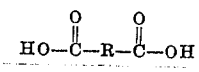

wherein R is a divalent organic radical including alkylene having one to 10 carbon atoms, such as methylene, trimethylene, tetramethylene, etc.; alkenylene having one to 10 carbon atoms, such as ethenylene, propenylene, etc.; cycloalkylene having four to 10 carbon atoms, such as cyclopentylene, cyclohexylene, etc.; and arylene having six to 10 carbon atoms, such as phenylene, naphthylene, etc.

Representative of suitable acids are oxalic acid, malonic acid, succinic acid, glutaric acid, adipic acid, pimelic acid, suberic acid, azelaic acid, sebacic acid, dodecanedioic acid, undecanedioic acid, maleic acid, fumaric acid, glutaconic acid, 2-octenedioic acid, 1,3-cyclopentanedicarboxylic acid, 1,4-cyclohexanedicarboxylic acid, phthalic acid, isophthalic acid, terephthalic acid, 1,3,5-benzenetricarboxylic acid, 1,8-naphthalenedicarboxylic acid, 1,2,3,4-cyclopentanetetracarboxylic acid, 1,2,3,4-benzenetetracarboxylic acid, 1,1,5-pentanetricarboxylic acid, 1,2,4-hexanetricarboxylic acid as well as a variety of others.

It will be understood by those skilled in the art that anhydrides and acid halides, particularly the acid chlorides, derived from the foregoing acids may similarly be employed.

The polyols useful in accordance with the invention are aliphatic polyols containing 2-10 carbon atoms and 2-4 hydroxy groups per molecule. Illustrative polyols include ethylene glycol, propylene glycol, 1,4-butylene diol, hexamethylene glycol as well as a variety of others.

The organo silanes suitable for use in the present invention are preferably those having the general formula:

wherein n is an integer from 1 to 3, Z is a readily hydrolyzable group such as an alkoxy group having 1-10 carbon atoms, such as methoxy, ethoxy, propoxy, etc., or halogen and R is hydrogen or an organic but in which at least one of the R groups is an organic group including alkyl having 1-10 carbon atoms, such as methyl, ethyl, propyl, etc.; alkenyl having 2-10 carbon atoms, such as vinyl, allyl, etc.; cycloalkyl having 4-10 carbon atoms, such as cyclopentyl, cyclohexyl, etc.; aryl having 6-10 carbon atoms, such as phenyl, naphthyl, etc.; alkenyl-carbonyloxyalkyl, such as acryloxypropyl, methacryloxypropyl, etc.; or alkyloxyalkyl, such as ethylene oxyethyl, ethyleneoxypropyl, etc. In addition, the epoxy and halo-derivatives of the foregoing groups may also be employed. Illustrative of suitable silanes are methyltrimethoxy silane, ethyltrimethoxy silane, vinyl diethoxy silane, vinyl triethoxy silane, allyltrimethoxy silane, cyclohexyltrimethoxy silane, cyclohexylethyltriethoxy silane, phenyltriethoxy silane, methacryloxypropyltrimethoxy silane, glycidoxypropyltrimethoxy silane, gamma-chloropropyltrimethoxy silane and 3,4-epoxycyclohexylethyltrimethoxy silane as well as a variety of others.

It is frequently preferred to employ an amino silane in place of the organo silanes set forth above, wherein the amino silanes have one to three alkoxy groups having one to 10 carbon atoms and at least one organic group attached directly to the silicon atom having up to 10 carbon atoms and containing at least one amino group, with any remaining valences on the silicon atom being taken up by hydrogen atoms.

The preferred amino silanes are those having the general formula:

wherein Z and n are as set forth above, x is zero or an integer from 1 to 4, and R is a divalent organic radical including alkylene having one to 6 carbon atoms, such as methylene, ethylene, etc.; alkenylene having two to six carbon atoms, such as ethenylene, propenylene, etc.; phenylene or phenylene alkylene, such as phenylene methylene, etc.

Illustrative of the amino silanes contemplated are gamma-aminopropyltriethoxy silane, beta-aminovinyldiethoxy silane, gamma-aminoallyltriethoxy silane, para-aminophenyltriethoxy silane, N-(gamma-triethoxysilylpropyl)propylamine, N-(beta-aminoethyl)-gamma-aminopropyltriethoxy silane, N[N'(beta-aminoethyl)-beta-aminoethyl]-gamma-aminopropyltriethoxy silane.

Without limiting the invention as to theory, it is believed that the unexpected improvements in the characteristics of polyester fibers embodying the features of the present invention are due at least in part to a cross-linking effect provided by the silane in the polyester polymer chain in accordance with the following:

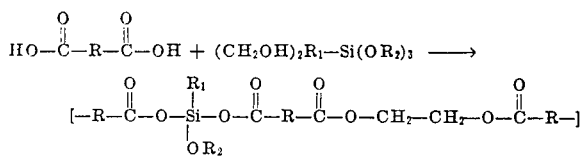

whereby the alkoxy group $OR_2$ provides a reactive side for cross linking of the polymer chain as follows:

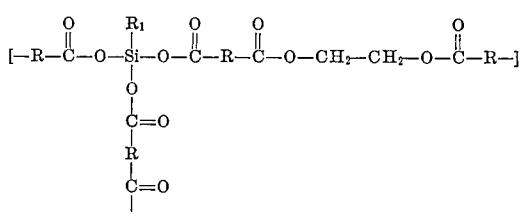

As will be appreciated by those skilled in the art, when an amino silane is employed, the amino group provides an additional reactive size for cross linking by an amide mechanism, as is illustrated as follows:

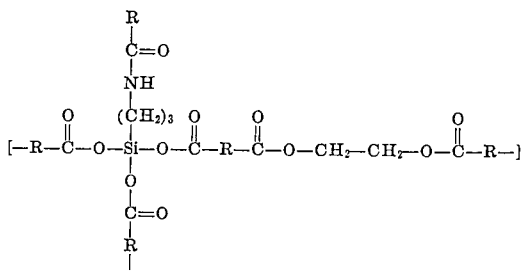

Thus, the polyester fibers of the present invention are characterized by a degree of cross-linking which was heretofore unobtainable.

It will be understood that when an amino silane is employed, the polymer chain will also contain amide groups in addition to ester groups which are formed by the reaction of the polycarboxylic acid with the amine group in the amino silane. However, this is not disadvantageous since the cross-linking effect of the amino silanes remains by virtue of the alkoxy groups attached to the silicon atom so as to provide reactive sites for the cross-linking reaction.

It will similarly be appreciated that when Z in the silane compound is other than alkoxy, the readily hydrolyzable group is hydrolyzed by means of the polyol and/or water present in the reaction mixture so as to form an alkoxy-substituted silane, silanol or a polysiloxane in situ which similarly provides reactive sites for the cross linking reaction.

It is generally preferred to provide a silane polybasic acid ratio of 1 mole of silane for each 10 to 100 moles of the polybasic acid. As disclosed above, it is generally preferred to add the silane to the acid monomer prior to reacting the acid monomer with the polyol monomer. Thereafter, the acid containing the monomer is polymerized in a conventional manner, and the resulting polymer melt spun.

However, it will be understood that the silane may be added to either the polycarboxylic acid or a mixture of the polycarboxylic acid and the polyol in polymerized or in an unpolymerized state so long as the silane is added prior to the melt spinning operation. For example, the silane can be added to the unpolymerized reaction mixture of the acid in the polyol. Alternatively, the silane can be added to the polyester after it has been manufactured or granulated or comminuted to a finely divided form whereby the transesterification reaction between the polyester and the silane takes place during the melt spinning operation.

When the silane is added to the acid prior to reaction of the acid with the polyol, it is frequently desirable to maintain the mixture of the acid and the silane at an elevated temperature, such as temperatures above 80° C., for a period up to 3 hours in order to insure complete reaction of the silane with the acid prior to polymerization of the acid. Alternatively, it is also possible to simply admix the silane with the acid, and then immediately react the acid-silane mixture with the polyol. The reaction between the acid and the polyol may be conveniently carried out in accordance with conventional procedures and apparatus. For example, it is possible to use as the apparatus a conventional melt blend apparatus operated at a temperature in excess of 150° C., and preferably in excess of 200° C., for a period of 1 to 30 hours. It will similarly be understood that conventional acidic or basic esterification or transesterification catalysts may be used, if desired.

The following examples will illustrate the principle concepts of the invention.

EXAMPLE 1

Six moles of terephthalic acid are admixed with 1 mole of vinyltriethoxy silane, and the resulting mixture is heated to 110° C. for a period of 1 hour. Thereafter, the resulting mixture is reacted with 6 moles of ethylene glycol for 12 hours at 210° C. in a melt polymerization apparatus.

The resulting silanized polyester is melt spun in a conventional apparatus to provide a polyester fiber having superior stability and tensile strength at elevated temperatures.

EXAMPLE 2

In this example, maleic anhydride is contacted with glycidoxypropyltriethoxy silane for a period of 1 hour at 85° C., after which the resulting mixture is added to propylene glycol and melt polymerized for 15 hours.

The polyester is then melt spun to provide a polyester fiber having exceptional high temperature characteristics.

EXAMPLE 3

Adipic acid is contacted with gamma-aminopropyltrimethoxy silane for 10 minutes 80° C. Thereafter, the mixture is polymerized with hexamethylene glycol in the manner described in Example 1.

After melt spinning, the polyester fiber is combined with natural rubber in a conventional manner, and is found to possess excellent adhesion characteristics and tensile strength at high temperatures.

EXAMPLE 4

A melt of a polyester formed of maleic anhydride and hexamethylene glycol is blended with p-aminophenyltrimethoxy silane at 210° C. for a period of 2 hours.

The resulting polyester melt is melt spun, and excellent results are obtained where the polyester fibers are combined with elastomeric material.

EXAMPLE 5

The procedure of Example 4 is repeated except that the silane is N-(gamma-triethoxysilylpropyl)propylamine.

While not equivalent to the silanes discussed above, use can also be made of organic titanium compounds such as titanium esters in the polyester fibers in order to provide improved tensile strength at elevated temperatures and adhesion to elastomeric materials. Useful titanium esters in accordance with this concept of the invention are those having the general formula:

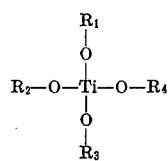

wherein $R_1$, $R_2$, $R_3$ and $R_4$ are each selected from the group consisting of alkyl groups having one to 10 carbon atoms, such as methyl, ethyl, isopropyl, etc.; alkenyl having two to 8 carbon atoms, such as vinyl, allyl, etc.; cycloalkyl having four to 10 carbon atoms, such as cyclopentyl, cyclohexyl, etc.; aryl having six to 16 carbon atoms, such as phenyl, naphthyl, etc.

The foregoing titanium compounds may be formulated into the polyester by the addition of the titanium compounds at any time prior to the melt spinning of the fiber. It is generally preferred to contact the titanium compound with the acid monomer for a time up to 3 hours prior to polymerization of the acid monomer with the polyol monomer to form the polyester product. The resulting polyester has a relatively high degree of cross-linking.

The cross-linking effect provided by the titanium esters is believed to be in accordance with the following:

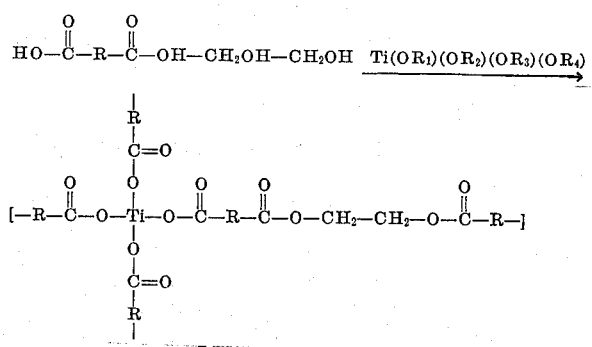

The following examples will serve to illustrate this concept of the invention.

EXAMPLE 6

Terephthalic acid is contacted with tetraethyl titanate at 120° C. for one-half hour, and the resulting mixture is melt polymerized with ethylene glycol for 12 hours.

The polyester is then melt spun according to conventional technique to provide polyester fibers. The fibers are combined with elastomeric materials, and good adhesion of the fibers to the rubber is experienced.

EXAMPLE 7

The same procedure employed in Example 6 is repeated, except that the titanate is tetra-isopropyl titanate.

In fabricating the combination of the polyester fibers prepared in accordance with the concepts of the present invention with elastomeric materials, the polyester fibers are mixed with elastomeric material or otherwise laid down in the desired arrangement for combination with elastomeric material as in the manufacture of polyester fiber-reinforced belts or in the manufacture of rubber tires reinforced with cords of polyester fibers. The elastomeric material will thus constitute the continuous phase in which the polyester fibers are dispersed. The combination of polyester fiber and elastomeric material is pressed in a conventional manner by molding or cured under heat and compression for the advancement of the elastomeric material to a cured or vulcanized stage while in combination with the polyester fiber of the present invention whereby the polyester fibers become strongly integrated with the elastomeric material in the polyester fiber-elastomeric product.

It will be apparent that I have provided a new and improved polyester fiber for use in the manufacture of polyester fiber-reinforced elastomeric products. It will also be understood that the polyester fiber prepared in accordance with the concepts of the present invention may be successfully adapted to a wide variety of other uses, such as the manufacture of polyester fiber-reinforced plastic products, for textiles and a wide variety of other uses.

It will be understood that various changes may be made in the details of formulation and methods of preparation and use without departing from the spirit of the invention, especially as defined in the following claims.

I claim:

1. In a polyester fiber-reinforced elastomeric product in which a rubbery elastomer constitutes a continuous phase in which the polyester fibers are distributed, the improvement comprising polyester fibers formed of a polyester prepared by reaction of a carboxyl material selected from the group consisting of a polycarboxylic acid, its anhydride and acid halide, a polyol and an amino silane containing one to three readily hydrolyzable groups and at least one organic group attached directly to the silicon atom having up to 12 carbon atoms and containing at least one amino group, with any remaining valences on the silicon atom being taken up by hydrogen, with the amino silane being present in an amount within the range of 1 mole per every 10–100 moles of carboxyl material, at a temperature of at least 80° C.

2. A polyester fiber-reinforced elastomer as defined in claim 1 wherein said polycarboxylic acid is an aliphatic or aromatic polycarboxylic acid having two to 25 carbon atoms and two to four carboxyl groups.

3. A polyester fiber-reinforced elastomer as defined in claim 1 wherein said polyol is selected from a group consisting of aliphatic polyols containing two to 10 carbon atoms and two to four hydroxy groups.

4. A polyester fiber-reinforced elastomer as defined in claim 1 wherein said polycarboxylic acid has the formula:

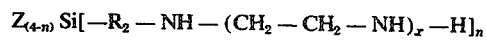

wherein $R_1$ is a divalent organic radical selected from the group consisting of alkylene, alkenylene, cycloalkylene and arylene.

5. A polyester fiber-reinforced elastomer as defined in claim 1 wherein said readily hydrolyzable group is selected from a group consisting of alkoxy and halogen.

6. A polyester fiber-reinforced elastomer as defined in claim 1 wherein the amino silane has the formula:

$$Z_{(4-n)} Si[-R_2 - NH - (CH_2 - CH_2 - NH)_x - H]_n$$

wherein Z is a readily hydrolyzable group, $n$ is an integer from 1 to 3, $x$ is an integer from 1 to 4 and $R_2$ is selected from the group consisting of alkylene, alkenylene, phenylene and phenylalkylene.

7. A polyester fiber-reinforced elastomer as defined in claim 1 wherein the amino silane is added to said carboxyl material prior to the reaction of said acidic material with said polyol.

8. A polyester fiber-reinforced elastomer as defined in claim 7 wherein the amino silane is maintained in contact with said carboxylic material for a time up to 3 hours prior to reaction of said acidic material with said polyol.

9. A polyester fiber-reinforced elastomer as defined in claim 1 wherein said acidic material is reacted with said polyol at a temperature greater than 150° C.

* * * * *